Feb. 16, 1971  G. F. RITTER, JR  3,563,721

GLASS SHEET SUPPORTING PRESS BENDING AND CONVEYING APPARATUS

Filed May 24, 1968

INVENTOR

George F. Ritter, Jr.

BY Collins & Oberlin

ATTORNEYS

United States Patent Office 3,563,721
Patented Feb. 16, 1971

3,563,721
GLASS SHEET SUPPORTING PRESS BENDING, AND CONVEYING APPARATUS
George F. Ritter, Jr., Toledo, Ohio, assignor to Libbey-Owens-Ford Glass Company, Toledo, Ohio, a corporation of Ohio
Filed May 24, 1968, Ser. No. 731,998
Int. Cl. C03b 23/02
U.S. Cl. 65—273                                  5 Claims

ABSTRACT OF THE DISCLOSURE

Conveyor rolls for supporting and conveying glass sheets in a press bending apparatus. Each roll comprises a driven shaft and a sheet supporting sleeve surrounding said shaft and adapted for rotation with or relative to said shaft. The shaft has limited friction driving engagement with the sleeve which permits the roll to advance an unrestrained sheet supported thereon but allows slippage to occur between the sleeve and the shaft when movement of the sheet is restrained.

---

The present invention relates generally to supporting and conveying apparatus and more particularly to improved conveyor apparatus for transferring and supporting glass sheets while they are in a heat-softened condition.

In producing curved or bent glass sheets in large quantities, such as is encountered in the commercial production of glazing closures for automobiles or the like, it is common practice to transfer the glass sheets by means of externally driven roll-type conveyors successively through a heating area, a bending area and then to an area in which further heat treatment, such as annealing or tempering, is carried out.

In the bending area, it is customary to locate each glass sheet in bending position by causing its leading edge to be carried against positive stops which hold the sheet in a position between complemental bending mold members. The sheet is then lifted from the conveyor rolls and pressed between the mold members to form the desired curvature. Since the glass sheet must be in a heat-softened condition when it is advanced into the bending area, its surfaces are very susceptible to marring and any relative movement between the glass sheet and the conveyor rolls which it contacts will tend to mar or mark the glass and render it commercially unacceptable for use as a glazing closure for automobiles. Such relative movement is most likely to occur as the sheet contacts the stops and if it is allowed to remain in contact with the rotating conveyor rolls after its own forward movement has been stopped. This time lag may be avoided through precise timing between the stop actuating mechanism and that which lifts the glass sheet from the conveyor rolls, but it is extremely difficult to maintain the precision required throughout a production run due to wear and other variables which affect the adjustments.

Therefore, it is an important object of this invention to provide improved supporting and conveying apparatus which will eliminate relative movement between the surfaces of the conveyor rolls and the glass sheets without the need for precise timing equipment and periodic adjustment.

Another object of the invention is to eliminate such relative movement by the provision of an improved conveyor roll which will permit relative movement to occur within the roll itself rather than between the roll and the glass sheet when the sheet becomes stationary upon the roll.

A further object of the invention is to provide such a conveyor roll which includes an inner driven member and an outer sheet supporting member adapted for rotation with or relative to said driven member, there being sufficient friction between said members to provide a driving force on the outer member capable of sustaining free movement of a glass sheet supported thereon, but insufficient to enable the outer member to rotate when the forward motion of the sheet is halted or slowed down with respect to the rotation of the roll.

Other objects and advantages of the invention will become more apparent during the course of the following description when taken in connection with the accompanying drawings.

In the drawings, wherein like numerals are employed to designate like parts throughout the same:

Figure 1:
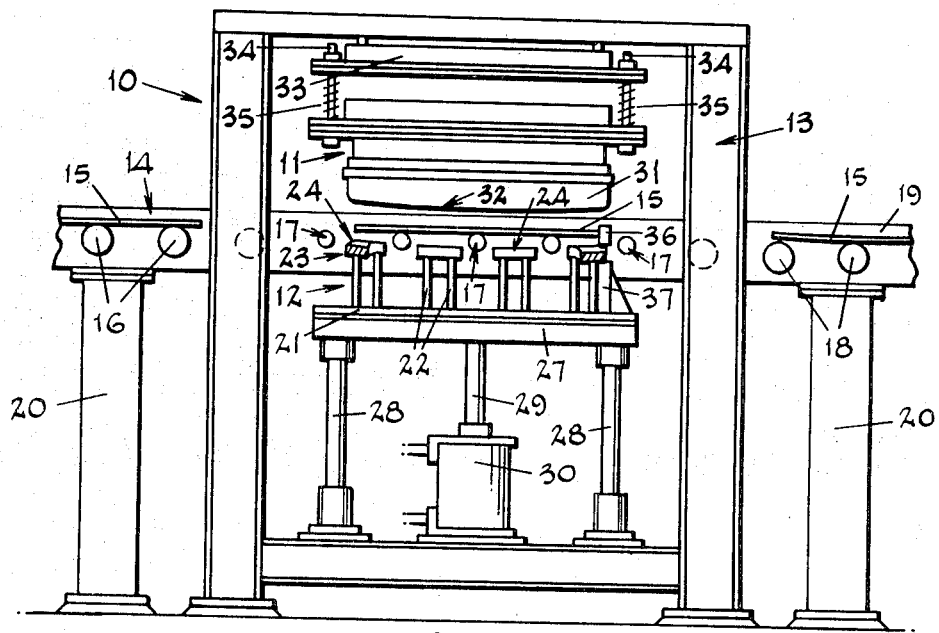
FIG. 1 is a side elevation of a horizontal press bending apparatus showing a glass sheet to be bent supported on conveyor rolls incorporating the present invention.

Referring to the drawings, the novel features of the present invention have been depicted as incorporated in apparatus used in "press bending" glass sheets; however, it will become apparent that the invention can be of utility in any situation in which articles being carried upon a continuously moving conveyor must be slowed down or stopped.

Thus, in FIG. 1 there is illustrated a typical press bending apparatus 10 consisting mainly of a substantially stationary upper male mold member 11, and a movable lower female mold member 12, suitably mounted within a rigid framework 13. A conveyor system, designated generally by the numeral 14, is provided to transfer glass sheets 15 into the bending apparatus 10, to support the sheets therein, and to subsequently remove the bent sheets therefrom upon completion of the bending operation. More particularly, the conveyor system 14 comprises entry conveyor rolls 16 which extend from a heating area, such as a furnace in which the glass sheets are brought to the required temperature, to the bending apparatus; supporting rolls 17 within the bending apparatus; and exit rolls 18 extending from the bending apparatus to a tempering or annealing area, all mounted for rotation between parallel rails 19 which are supported by upright beams 20 along opposite sides of the bending apparatus 10.

The lower mold member 12 is of outline or ring-type construction and comprises a base member 21, a plurality of supports 22 upstanding from said base member, and a shaping element, indicated generally by the numeral 23, which is fixed to the tops of the supports 22. The shaping element 3 conforms in outline to that of the glass sheets 15 to be bent, and a shaping surface 24, conforming to the curvature of the sheet when bent, is formed on the upper surface thereof.

In the illustrative embodiment, the lower female mold member 12 is vertically movable to lift the glass sheet to be bent from the conveyor rolls 17 into pressing engagement with the upper male mold member 11 and in order to provide clearance for the conveyor rolls 17 the shaping element 23 is made up of a plurality of sections including transversely disposed end sections 25, and longitudinally spaced bar portions or segments 26 between which the conveyor rolls pass upon raising and lowering of the sheet.

The base 21 of the lower mold member 12 is fastened to a carriage 27 which is supported by telescoping guide members 28 allowing vertical movement only, said vertical movement being provided by the ram 29 of an air cylinder 30, which bears against the carriage.

The substantially stationary upper mold member 11 comprises a cup-like shaping element 31 provided with a continuous shaping surface 32 conforming in outline and curvature to the bent configuration of the sheet. The mold member 11 is resiliently supported from a mounting frame 33, which depends from the main framework 13 by bolts 34, and springs 35 surround the bolts to space the mold member 11 from the frame 33. The springs 35 act as cushions to prevent excessive pressure from being exerted on the glass sheet by the lower mold member 12 as it moves upward into pressing engagement with the upper mold member 11.

Flat glass sheets 15, heated to the required softening point, are transferred from the heating area into the bending apparatus 10 by the entry conveyor rolls 16 and are received in position to be bent on the supporting rolls 17. As each sheet arrives between the mold members it is halted by engagement of its leading edge with locator stops 36 which are moved into and out of the path of sheet movement by air cylinders 37 mounted on the base member 21. A photoelectric cell, or other suitable detection device, senses the entry of the glass sheet into the bending area and initiates a bending cycle by energizing timing mechanisms which control the actions of the press actuating cylinder 30 and the stop actuating cylinders 37.

When the leading edge of a sheet of glass 15 entering the bending apparatus engages the locator stops 36 there will be a short time lag before the lower mold member 12 is raised by the ram 29 to lift the sheet from the rolls 17. It has been found that even the most careful monitoring of the bending operation cannot be expected to reduce this lag to below about two-tenths of a second and this has proved to be sufficient time for distortion or marring of the sheet surface to occur due to the relative movement between the revolving surfaces of the rolls and the stationary, heat softened glass sheet.

According to the present invention, this objectionable condition is alleviated by forming each of the conveyor rolls 17 with an inner positively driven shaft 38 and an outer sheet supporting sleeve 39 which is adapted for rotation with or relative to said shaft. Thus, the shaft and sleeve are associated with one another in such a manner that the sleeve will be driven by the shaft so long as the glass sheet is moving with respect to the rolls, but will slip thereon when forward movement of the sheet is stopped.

Figure 2:
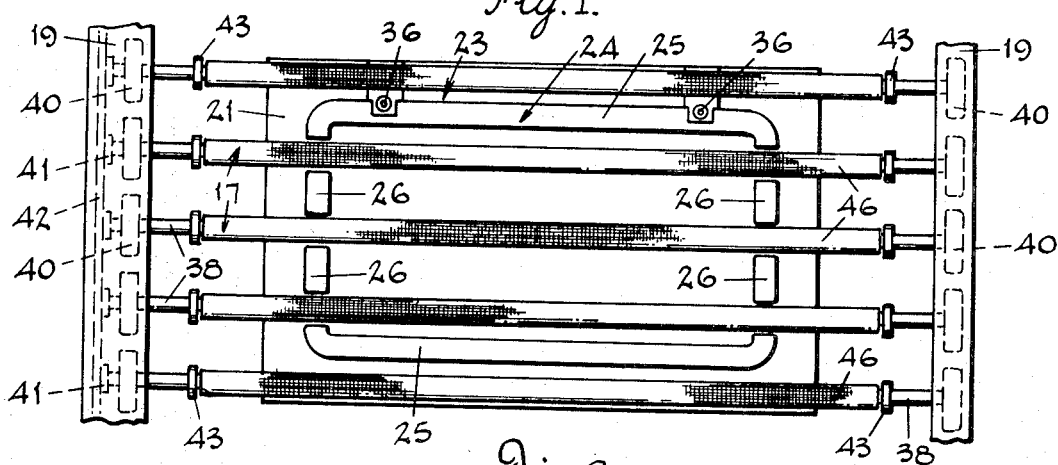
FIG. 2 is a partial plan view showing the conveyor rolls in relationship to the lower mold member.

As illustrated in FIG. 2, the rolls 17 are mounted by journaling the opposite ends of the shafts 38 in bearings 40 which are carried on the rails 19. At one end, the shafts 38 extend through the related bearings and are provided with drive means, such as sprockets 41 and a chain 42, whereby the complete set of rolls 17 can be driven in unison.

The outer sleeve 39 of each of the conveyor rolls 17 is somewhat shorter than the shaft 38 and is centered thereon by means of shaft collars 43 which are secured to the shaft 38 by set screws 44 or in some other suitable manner. In positioning the sleeve 39 on the shaft 38, a narrow gap 45 is left between the ends of the sleeve and the shaft collars 43 in order to allow for expansion as the components become heated during operation.

A cover 46 of an asbestos or fibre glass material is preferably stretched over the sleeve 39 in order to provide a resilient, heat resistant, non-marring surface in contact wtih the softened glass sheets.

Figure 3:
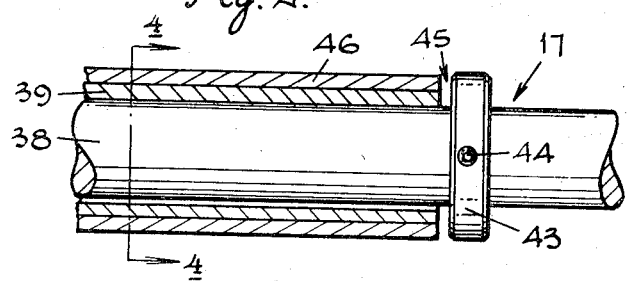
FIG. 3 is an enlarged fragmentary sectional view of a conveyor roll taken along its axis of rotation.
Figure 4:
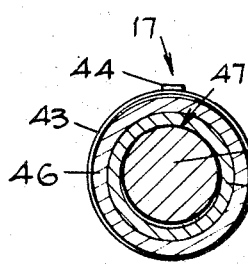
FIG. 4 is a cross sectional view of the conveyor roll taken along line 4—4 of FIG. 3.

As shown in FIGS. 3 and 4 the inside diameter of the sleeve 39 is relatively larger than the diameter of the shaft 38 so that when the sleeve is resting freely on the shaft it is eccentric thereto and frictional contact occurs only at the uppermost portion 47 of the shaft 38. As a result, the driving force which is imparted by the shaft 38 to the sheet supporting sleeve 39 is limited by the frictional force which can be generated between the metal surfaces of the shaft and sleeve at the theoretical point or line of engagement 47. The effect of this construction is that so long as a glass sheet 15 is moving freely (e.g. from left to right in FIG. 1) over the conveyor rolls 17, the frictional force between the shaft 38 and sleeve 39, which is required to drive the sleeve and continue the forward motion of the glass sheet, is less than that which is generated by the weight of the glass and the sleeve so that the sleeve is caused to rotate with the shaft. However, once the forward motion of the sheet is stopped by the application of an external force, such as that represented by the locator stops 36, the frictional force required to move the sheet becomes much greater than that which can be generated between the shaft and the sleeve, whereupon slippage will occur between the shaft 38 and the sleeve 39. This slippage will continue until the sheet 15 is lifted free of the rolls 17 by the upward movement of the lower mold member 12. If conventional conveyor rolls were used slippage would occur between the rolls and the glass; however, it has been discovered that the frictional force between the surface of the cover 46 and the glass surface will always be greater than the frictional force between the shaft 38 and the sleeve 39 so that the slippage always occurs between the latter members.

In a typical operational cycle, heat-softened sheets of glass 15 are transferred by the entry rolls 16 from a heating area into the bending apparatus 10 where they are received on the supporting rolls 17, said rolls continuing to advance the sheet forwardly until the leading edge thereof engages the locator stops 36 as previously described. At this point, air pressure is supplied to the bottom of the cylinder 30 causing the ram 29 to move upward, raising the lower mold member 12 past the rolls 17 and lifting the sheet 15 therefrom. During the time interval between stoppage and lifting of the sheet, slippage occurs between the sleeve 39 and the shaft 38 as the driven saft continues to rotate, with no relative movement occurring between the roll surface and the softened sheet surface.

As the glass sheet 15 is lifted from the rolls 17, the locator stops 36 are automatically lowered to an out-of-the-way position below the level of the top surfaces of the rolls so that after the sheet has been press bent between the shaping surfaces 24 and 32 and returned to the rolls 17 by the lower mold member 12, the sheet will be free to be moved out of the bending apparatus onto the rolls 18.

When the bent sheet is returned to the rolls 17 it is in an unrestrained condition insofar as forward movement thereof is concerned and once again the force required to advance the sheet is less than the frictional force which can be generated between the shaft 38 and the sleeve 39 so that the sleeve will be driven by the shaft and the sheet moved forward onto the exit conveyor rolls 18.

By eliminating possible relative movement between the heat-softened glass sheets and the surface of the conveyor rolls the time lag between stoppage of the sheet and its removal from the rolls becomes insignificant with regard to its effect on possible marring of the sheet surface. There is thus no need for elaborate timing devices to insure immediate removal of the stationary sheet from the moving roll.

It is to be understood that the form of the invention herewith shown and described is to be taken as an illustrative embodiment only of the same and that various changes in the shape, size and arrangement of parts may be resorted to without departing from the spirit of the invention.

I claim:

1. In apparatus for the horizontal bending of glass sheets, a bending mold having an upper bending member and a ring-type lower bending member spaced therefrom, a plurality of conveyor rolls mounted for rotation within said ring-type lower bending member for supporting said glass sheet between said spaced bending members, and means for moving said lower bending member upwardly to lift said sheet from said conveyor rolls and bend the same against said upper bending member and downwardly to return the bent sheet to initial position, the improvement which consists in that each of said conveyor rolls comprises a driven shaft, a load supporting sleeve eccentrically supported on said shaft and adapted to rotate with or relative to said shaft, and means for maintaining said sleeve in a predetermined axial position along said shaft, said sleeve comprising an elongated cylinder having an inner diameter relatively larger than the outer diameter of the shaft whereby said sleeve is freely supported on said shaft to provide frictional driving engagement therebetween substantially at the point of support.

2. The improvement according to claim 1, including a covering of a soft, non-abrasive, resilient material for said load supporting sleeve.

3. A conveyor roll, comprising a driven shaft, a load supporting sleeve surrounding the shaft and adapted for rotation with or relative to said shaft, and means for maintaining said sleeve in predetermined axial position along said shaft, said sleeve comprising an elongated cylinder having an inner diameter relatively larger than the outer diameter of said shaft and freely supported by said shaft to provide frictional driving engagement therebetween at substantially the point of support.

4. A conveyor roll as defined in claim 3, in which said sleeve is provided with a covering of a soft, non-abrasive, resilient material.

5. A conveyor roll as defined in claim 3, in which said sleeve engages the shaft along substantially a single line of contact to provide the frictional driving engagement therebetween.

References Cited
UNITED STATES PATENTS

| | | | |
|---|---|---|---|
| 2,223,124 | 11/1940 | Owen | 65—289X |
| 2,262,325 | 11/1941 | Kendall | 198—127X |
| 2,602,536 | 7/1952 | Eggleston | 198—127 |

ARTHUR D. KELLOGG, Primary Examiner

U.S. Cl. X.R.

65—275, 289; 198—127